United States Patent [19]

Angel et al.

[11] Patent Number: 4,488,887
[45] Date of Patent: Dec. 18, 1984

[54] COLD TRAP

[75] Inventors: Anthony L. Angel, Winston-Salem; James L. Harris, Westfield; Michael F. Dube, Pfafftown, all of N.C.

[73] Assignee: R. J. Reynolds Tobacco Company, Winston-Salem, N.C.

[21] Appl. No.: 542,267

[22] Filed: Oct. 17, 1983

[51] Int. Cl.³ .................. B01D 45/08; B01D 50/00
[52] U.S. Cl. ........................ 55/269; 55/308; 55/422; 55/DIG. 15; 73/863.12; 73/863.22; 73/863.41
[58] Field of Search .......... 55/269, 307, 422, 436, 55/442, 445, 446, 465, DIG. 15, DIG. 17, 308; 62/55.5; 73/863.12, 863.22, 863.41

[56] References Cited

U.S. PATENT DOCUMENTS

| 151,263 | 5/1874 | Audouin et al. | 55/269 |
| 1,769,778 | 7/1930 | Field | 55/446 |
| 2,015,288 | 9/1935 | Rosen | 55/DIG. 17 |
| 2,162,550 | 6/1939 | Frankford | 55/436 |
| 2,290,323 | 7/1942 | Graham | 55/436 |
| 3,396,515 | 8/1968 | Wright | 55/269 |
| 3,606,738 | 9/1971 | Kraus, Jr. | 55/446 |
| 3,693,457 | 9/1972 | Pilat | 73/28 |
| 3,938,366 | 2/1976 | Wertlake et al. | 55/445 |

FOREIGN PATENT DOCUMENTS

| 456370 | 8/1924 | Fed. Rep. of Germany | 55/436 |
| 5103 | 1/1981 | Japan | 55/269 |
| 56101 | 4/1944 | Netherlands | 55/436 |
| 216630 | 9/1941 | Switzerland | 55/436 |

Primary Examiner—David L. Lacey
Attorney, Agent, or Firm—Herbert J. Bluhm

[57] ABSTRACT

A cold trap for collecting components of an aerosol stream comprises an elongated vessel provided with an aerosol stream inlet and an aerosol stream outlet, a cooling jacket for subjecting a substantial portion of the walls of the vessel to temperatures below 0° C. and a baffle assembly that includes a plurality of spaced baffle plates which cooperate to present a tortuous path to the flow of the aerosol stream as it moves through the vessel.

8 Claims, 12 Drawing Figures

COLD TRAP

TECHNICAL FIELD

This invention relates to a cold trap device for recovering components contained in an aerosol stream that is passed through the device.

BACKGROUND ART

The processing of various fluids to remove certain constituents therefrom has been of considerable interest for many years. A variety of devices have been employed for effecting removal of the constituents including contact with cold surfaces to promote condensation of the constituents and passage through apertured plates or baffles designed to promote impaction of the fluid against condensing surfaces. One such device is described in U.S. Pat. No. 151,263 which utilizes a vertically disposed, jacketed column containing a number of perforated plates through which the gaseous medium passes. The condensable constituents are collected in a receiver attached to the lower end of the column.

Apparatus intended primarily for separating water from steam is disclosed in U.S. Pat. No. 3,606,738. This apparatus comprises a vertical cylindrical chamber with several vertically spaced baffle plates provided with ports through which the steam passes. Separate drain lines associated with each baffle plate remove the water and condensed steam from the chamber.

Disclosed in U.S. Pat. No. 3,693,457 is a cascade impactor for measuring the quantity and size distribution of suspended particles in an aerosol stream. The impactor comprises a vertical cylindrical chamber containing a number of apertured plates and impaction plates arranged horizontally in alternating fashion. This device is designed for positioning directly in a stack or duct carrying the aerosol stream to be analyzed.

BRIEF SUMMARY OF INVENTION

This invention provides an improved cold trap for collecting condensable components of an aerosol stream.

It is a principal object of this invention to provide apparatus comprising cooling means and baffle means for recovering components of an aerosol stream for subsequent analysis.

A further object of this invention is to provide a novel cold trap design that facilitates disassembly of the trap for cleaning purposes and/or recovering samples collected therein.

An additional object of this invention is to provide an improved cold trap that is particularly designed to accommodate aerosol streams containing appreciable amounts of water vapor.

Other objects and advantages will be apparent from the description which follows.

DETAILED DESCRIPTION OF THE INVENTION

Figure 1:
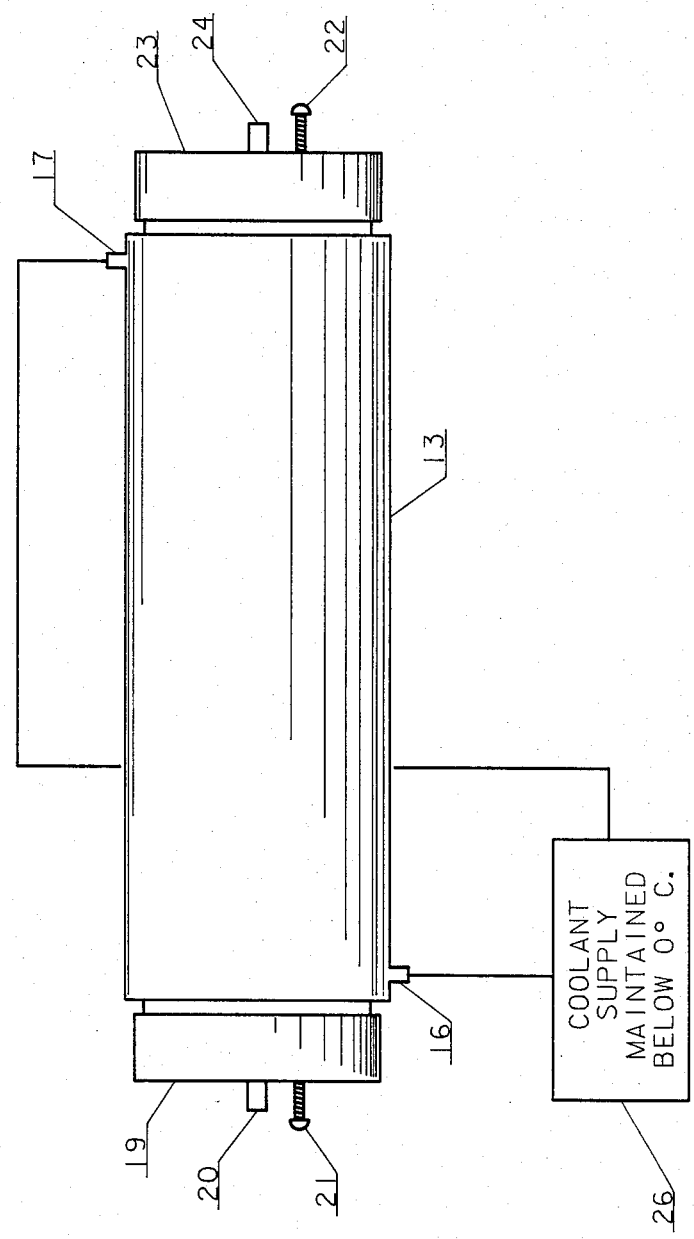
FIG. 1 is a side elevational view, partially diagrammatic, of an embodiment of the present invention in its assembled form.

The invention disclosed herein is directed to a cold trap that is ideally suited to the collection of condensable components of an aerosol stream for subsequent analysis. The cold trap comprises an elongated vessel having side walls which connect the entrance end and exit end of the vessel. The vessel is provided with end closures disposed at the entrance and exit ends in sealing engagement with the side walls with at least one of the end closures being removable. Inlet means are provided for introducing an aerosol stream into the entrance end of the vessel and outlet means are provided for withdrawing the residual gaseous stream (primarily air) from the exit end of the vessel. Means are also provided for subjecting a substantial portion of the side walls of the vessel to temperatures below 0° C. A removable baffle assembly is adjustably positioned within the elongated vessel intermediate its entrance and exit ends and the assembly includes a rod that extends in a substantially longitudinal direction with respect to the vessel and that supports a plurality of spaced baffle plates which cooperate to present a tortuous path to the flow of an aerosol stream moving through the vessel. The baffle plates are preferably oriented essentially transversely to the longitudinal axis of the vessel and the majority of the plates are designed to have their peripheral edges in substantial contacting relationship with the inside surface of the side walls of the vessel and to have at least one aperture through which the aerosol stream may pass. At least one of the baffle plates located adjacent the entrance end of the elongated vessel is preferably not provided with an aperture for passage of the aerosol stream but is adapted to have its peripheral edge spaced inwardly from the side walls a sufficient distance to permit passage of the aerosol stream between the peripheral edge of the plate and the side walls. Preferably, at least two of the baffle plates located adjacent to the entrance end of the elongated vessel have peripheral edges spaced inwardly from the side walls of the vessel a sufficient distance to provide a passageway for the aerosol stream between the peripheral edges of the two baffle plates and the side walls. This passageway has a cross-sectional area that is between 10 and 30 percent of the transverse cross-sectional area of the elongated vessel.

The length and transverse measurements of the elongated vessel are not particularly critical and they will generally be determined by the quantity of condensable material that is to be collected for analysis. Nevertheless, the length of the vessel and the proportion of the side walls maintained at reduced temperatures must be sufficient to effect the desired separation. The number of baffle plates associated with the baffle assembly is also not critical as long as there are a sufficient number of plates to provide a sufficiently tortuous path for the aerosol stream. At least ten baffle plates are generally necessary and preferably twenty or more are used.

An important feature of this invention is that at least some of the baffle plates positioned at or near the entrance end of the elongated vessel are designed to promote contact of the aerosol stream with the side walls of the vessel. Since the side walls are maintained at temperatures below 0° C., the removal of water from the aerosol stream is accomplished primarily near the entrance end of the vessel where the aerosol stream is forced to contact the side walls by one or more baffle plates having peripheral edges which extend to a point that is spaced somewhat inwardly from the side walls. Preferably, these baffle plates leave an unobstructed path for the aerosol stream that is equivalent to about 10 to 30 percent of the transverse cross-sectional area of the aerosol passageway through the elongated vessel.

The materials used for constructing the presently disclosed cold traps must be capable of withstanding the reduced temperature and be essentially unreactive towards the aerosol stream components. Suitable materials include glass, metals, metal alloys and certain thermoplastic polymers. Stainless steel is particularly preferred due to its relative inertness and fabrication properties.

The side walls of the elongated vessel are preferably jacketed so that an appropriate fluid coolant can be circulated through the cooling jacket. Alcohol- or glycol-based media are satisfactory coolants which may be used. Alternatively, the side walls of the elongated vessel may be provided with refrigeration coils and associated temperature controls for maintaining the desired side wall temperatures.

The operation of the cold trap is more or less conventional with the aerosol stream being introduced into the inlet means under sufficient pressure to force the stream through the cold trap and the outlet means. Preferably, a vacuum source is connected to the outlet means to pull the aerosol stream through the trap. Generally, vacuum at gauge pressures of 10 to 120 centimeters of water applied to the outlet means of the cold trap are adequate to pull through the trap an aerosol stream that is introduced into the inlet of the cold trap. Passage of the aerosol stream through the cold trap is continued until the quantity of the collected condensate is sufficient for the desired analysis or until the capacity of the cold trap has been reached. Temperatures of the side walls during operation are maintained between −5° C. and −100° C. Preferably, the side walls are maintained at −50° C. to −90° C. during operation. Removal of the collected condensate from the cold trap can be effected by warming the trap to ambient temperatures and rinsing the condensate from the trap with a suitable solvent such as water. This cold trap is especially useful in processing the smoke aerosol from burning tobacco for the purpose of identifying and measuring certain smoke components.

Figure 2:
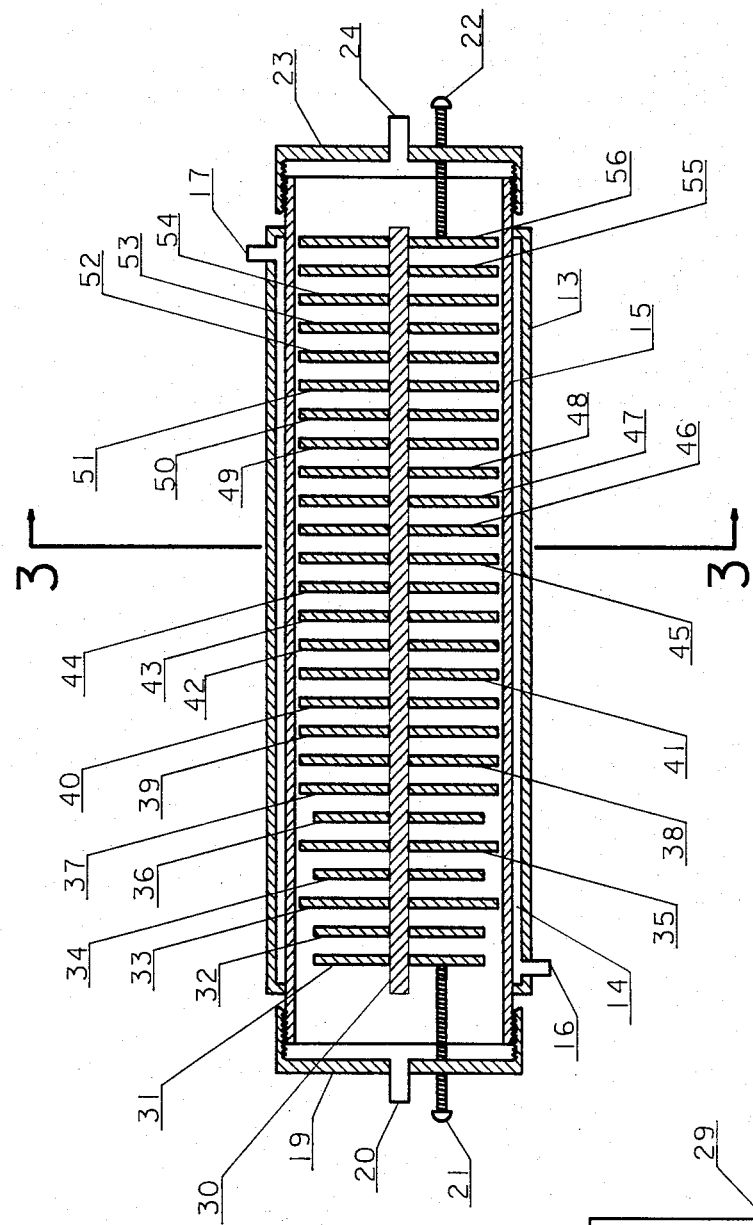
FIG. 2 is a sectional view of the device shown in FIG. 1 taken along a plane which passes through the longitudinal axis of the apparatus.

A preferred embodiment of the present invention is shown in the accompanying drawings. Cylinder 15 (see FIG. 2) is provided with end closures 19 and 23 which are screwed onto each end of cylinder 15 by means of threaded mating surfaces. Inlet means 20 extends through the wall of end closure 19 for introducing an aerosol stream into the elongated vessel formed by cylinder 15 and end closures 19 and 23. Outlet means 24 in end closure 23 serves as the exit for the residual gaseous stream from which the aerosol has been removed. A substantial length of cylinder 15 is concentrically surrounded by cooling jacket 13. A cooling fluid from coolant supply 26 is circulated through annular chamber 14 by means of inlet 16 and outlet 17. Slidably positioned within cylinder 15 is a baffle assembly composed of support rod 30 and circular baffle plates 31 through 56 firmly secured to rod 30. Adjusting screws 21 and 22 are mounted in threaded openings in end closures 19 and 23, respectively, and are adapted to contact baffle plates 31 and 56, respectively. Screws 21 and 22 permit controlled movement of the baffle assembly in a direction coinciding with the longitudinal axis of cylinder 15 after the cold trap has been assembled.

Figure 4:
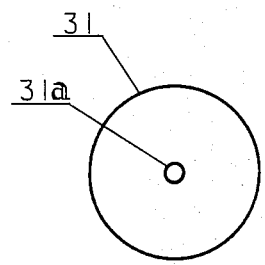
FIGS. 4 through 11 present plan views of representative baffle plates used in the device shown in FIG. 2.

In this preferred embodiment circular baffle plates 31, 32, 34 and 36 are identical and are somewhat smaller in diameter than the remaining baffle plates. As shown in FIG. 4, baffle plate 31 contains a single centrally located aperture 31a through which support rod 30 is inserted for attachment of the baffle plate to the support rod. Attachment of the baffle plate to the support rod may be achieved by welding, soldering or other suitable means. Since baffle plates 31, 32, 34 and 36 direct the aerosol stream into contact with the cold side walls, ice builds up on the side wall surface adjacent to these baffle plates and eventually seals off the annular passageway between the baffle plates and the side walls. The capacity of the cold trap can be effectively increased by moving the baffle assembly in a longitudinal direction a sufficient distance to move baffle plates 31, 32, 34 and 36 away from ice which collects on the side walls between the peripheral edges of the baffle plates and the side walls. Longitudinal movement of the baffle assembly is accomplished by adjusting screws 21 and 22.

Figure 3:
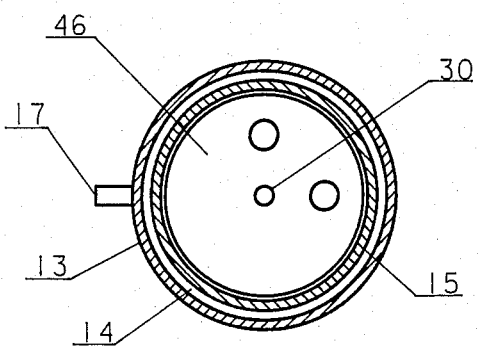
FIG. 3 is a transverse sectional view of the device shown in FIG. 1 taken along a plane passing through section line 3—3 of FIG. 2.
Figure 5:
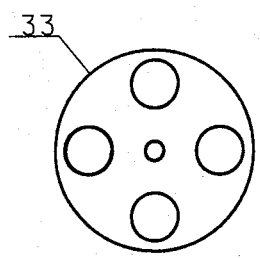
Figure 6:
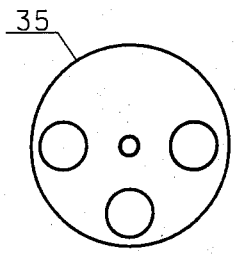
Figure 7:
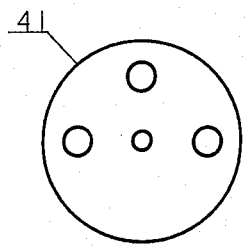
Figure 8:
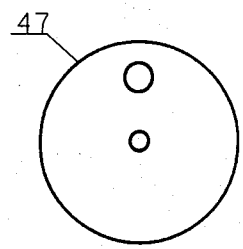
Figure 9:
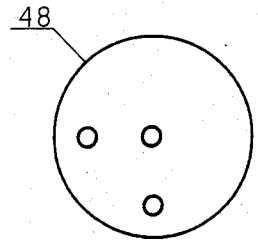
Figure 10:
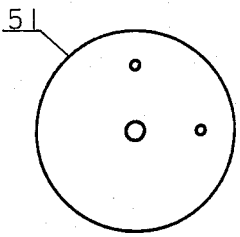
Figure 11:
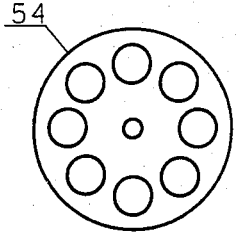

The remaining circular baffle plates in the baffle assembly each have a diameter that is between 1 and 3 percent less than the inside diameter of cylinder 15 and each has a centrally located aperture to accommodate support rod 30. Additionally, each of these baffle plates has one or more apertures through which the aerosol stream passes. Thus, baffle plate 33 shown in FIG. 5 is provided with four equally spaced apertures whereas baffle plates 35 and 41 are provided with three apertures spaced at 90° intervals as shown in FIGS. 6 and 7. Baffle plates 36 through 40 and 42 through 45 are similar to baffle plates 35 and 41, respectively. Baffle plates 46 (see FIG. 3), 48 (FIG. 9), 51 (FIG. 10) and 52 are each provided with two apertures spaced at 90° intervals whereas baffle plates 47 (FIG. 8), 49, 50, 55 and 56 are each provided with one aperture. Baffle plates 53 and 54 are each provided with eight apertures as shown in FIG. 11.

Figure 2A:
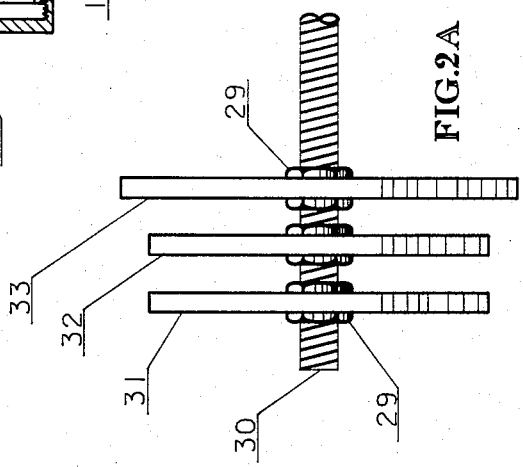
FIG. 2A is an enlarged side elevational view of a portion of a baffle assembly similar to that depicted in FIG. 2.

A preferred method of securing the baffle plates to support rod 30 is shown in FIG. 2A. By the use of cooperating nuts 29 each baffle plate can be positioned at the desired location on threaded support rod 30.

When securing the baffle plates to support rod 30, care should be taken so that the apertures in adjacent plates are not in alignment. The positioning of baffle plates 35 through 45, for example, should preferably involve rotating each succeeding baffle plate either 45° or 135° to insure maximum misalignment. The distance between adjacent baffle plates is not particularly critical and will depend to some extend on the physical size of the cold trap, the desired capacity, the temperature of the side walls and the flow rate of the aerosol stream. It is preferred, however, that the baffle plates near the exit end of the cold trap be more closely spaced to improve collection efficiency during the initial flow of aerosol through the trap.

Orientation of the cold trap during operation is not critical. Satisfactory results are obtained with the cold trap in either a vertical or a horizontal position or a position intermediate between vertical and horizontal.

Positioning at an angle of approximately 45° from horizontal is preferred.

EXAMPLE

A cold trap similar to that shown in the accompanying drawings is fabricated from a 12-inch length of stainless steel pipe having an inside diameter of 2.0625 inches. The external surface of each end of the pipe is threaded to permit attachment of threaded end closures. Each end closure is provided with an aperture into which is inserted a 0.25-inch diameter threaded male connector to which a length of flexible tubing is attached for introducing and withdrawing an aerosol stream. The threaded connector and tubing are fabricated from polytetrafluoroethylene. An 11.25-inch length of stainless steel pipe having an inside diameter of 2.5 inches is welded to the 12-inch length of pipe in concentric fashion to form an annular chamber between the external surface of the 12-inch length of pipe and the internal surface of the 11.25-inch length of pipe. The 2.5-inch diameter pipe is provided with a coolant inlet and outlet located at opposite ends of the pipe in diametrically opposed fashion for passing coolant through the annular chamber. A baffle assembly having a total of 25 stainless steel circular baffle plates is positioned within the 12-inch length of pipe. The baffle assembly is constructed of a threaded stainless steel rod 12 inches in length and 0.25 inch in diameter inserted through a hole in the center of each of the baffle plates with the baffle plates being spaced along the length of the rod. The baffle plates have a thickness of approximately 0.125 inch and they are secured to the rod by stainless steel nuts having a nominal thickness of 0.1875 inch. The nuts also serve as spacers for maintaining the baffle plates in the desired spaced relationship. Starting at the inlet end of the cold trap the relevant information concerning each baffle plate is as follows:

the annular chamber surrounding the inner stainless steel pipe. The alcoholic medium is maintained at a temperature of approximately −80° C. by a model No. LTE9 temperature controlled bath available from Neslab Instruments, Inc. of Portsmouth, N.H. Circulation of the cold alcoholic medium is continued and tobacco smoke aerosol generated by 20 cigarettes simultaneously smoked on a cigarette smoking machine is introduced at a measured flow rate into the cold trap via the polytetrafluoroethylene tubing connected to the inlet of the trap. A vacuum source connected to the polytetrafluoroethylene tubing that is associated with the outlet of the cold trap pulls the tobacco smoke aerosol through the trap. The reduced pressure at the exit end of the cold trap is initially adjusted to approximately 32.6 centimeters of water (gauge) to give a flow rate at the entrance end of the trap of 32 liters per minute. As condensate is collected in the cold trap the pressure at the exit end is gradually reduced to maintain the substantially constant flow of aerosol at the entrance end of the trap at 32 liters per minute.

After the desired number of cigarettes have been smoked, the vacuum source is disconnected, coolant flow is discontinued and the cold trap is allowed to warm to a temperature between 5° C. and 25° C. A micro-pump is then connected to the inlet and outlet tubes of the cold trap for the purpose of circulating 150 milliliters of distilled water through the trap. The distilled water containing the major portion of the collected condensate is then recovered and the cold trap is subsequently rinsed with 150 milliliters of methyl t-butyl ether again using the micro-pump. The recovered solutions of trapped condensates are then subjected to conventional analytical techniques for identifying and measuring components thereof.

What is claimed is:

1. A cold trap for effecting removal of components

| Baffle Plate No. | Baffle Plate Diameter In Inches | No. of Apertures | Size of Apertures In Inches | Angle Between Apertures | Distance in Inches from Peripheral Edge of Baffle Plate to Aperture |
|---|---|---|---|---|---|
| 1, 2, 4, 6 | 1.75 | None | — | — | — |
| 3 | 2.02 | 4 | 0.5 | 90° | 0.1875 |
| 5, 7, 8 | 2.02 | 3 | 0.5 | 90°, 180° | 0.125 |
| 9, 10 | 2.02 | 3 | 0.4375 | 90°, 180° | 0.125 |
| 11, 12 | 2.02 | 3 | 0.375 | 90°, 180° | 0.125 |
| 13, 14, 15 | 2.02 | 3 | 0.3125 | 90°, 180° | 0.1875 |
| 16 | 2.02 | 2 | 0.3125 | 90° | 0.1875 |
| 17, 25 | 2.02 | 1 | 0.3125 | — | 0.1875 |
| 18 | 2.02 | 2 | 0.25 | 90° | 0.3125 |
| 19, 20 | 2.02 | 1 | 0.25 | — | 0.3125 |
| 21, 22 | 2.02 | 2 | 0.125 | 90° | 0.3125 |
| 23, 24 | 2.02 | 8 | 0.47 | 45° | 0.125 |

In securing the baffle plates to the support rod, the stainless steel nuts are firmly tightened to prevent rotation of the plates with respect to the rod. Baffle plates 1 through 18 are spaced approximately 0.375 inch apart while baffle plates 18 through 25 are spaced approximately 0.1875 inch apart. Baffle plates 7 through 22 are secured after orienting each plate so that the apertures in adjacent plates are not aligned. Sufficient glass wool is inserted between baffle plates 23 and 24 to ensure that the aerosol stream cannot flow from an aperture in baffle plate 23 to an aperture in baffle plate 24 without encountering a mass of glass wool.

The assembled cold trap is mounted at an angle of about 45° from horizontal with the exit end of the trap at the lower elevation. The trap is cooled for about 15 minutes by circulating a cold alcoholic medium through from an aerosol stream which comprises:

(a) an elongated vessel having side walls connecting an entrance end and an exit end, (b) end closures disposed at said entrance and exit ends in sealing engagement with said side walls with at least one of said end closures being removable, (c) inlet means for introducing the aerosol stream into the entrance end of said vessel, (d) outlet means for withdrawing from the exit end of said vessel a residual gaseous stream from which the aerosol has been removed, (e) means for subjecting a substantial portion of the side walls to temperatures below 0° C., and (f) a removable baffle assembly slidably positioned and extending longitudinally within said elongated vessel intermediate its entrance and exit ends with said assembly including a rod and a plurality of spaced baffle plates supported thereon, said baffle plates being constructed and arranged so as to provide a tortuous path to the flow of said aerosol stream through said vessel, wherein at least one of the baffle plates located adjacent the entrance end of said vessel is constructed and arranged to direct said aerosol stream toward said side walls.

2. The cold trap of claim 1 wherein a majority of said baffle plates have their peripheral edges in substantial contacting relationship with the inside surface of said side walls.

3. The cold trap of claim 2 wherein said elongated vessel is cylindrical and the majority of said baffle plates are circular with a diameter that is between 1 and 3 percent less than the inside diameter of said elongated vessel.

4. The cold trap of claim 1 wherein said at least one baffle plate located adjacent the entrance end of sadi vessel comprises at least two baffle plates disposed substantially transversely to the longitudinal axis of said elongated vessel with the peripheral edges of said at least two baffle plates spaced inwardly from the side walls a sufficient distance to provide a passageway for the aerosol stream between said peripheral edges and said side walls, said passageway having a cross-sectional area that is between 10 and 30 percent of the transverse cross-sectional area of said elongated vessel.

5. The cold trap of claim 1 wherein said means for subjecting a substantial portion of the side walls to temperatures below 0° C. comprises an elongated chamber coaxially surrounding a substantial length of said elongated vessel with inlet and outlet means for circulating a fluid coolant through said chamber.

6. The cold trap of claim 1 wherein at least one of said end closures is provided with an adjusting screw designed to engage and to adjust the position of said baffle assembly.

7. The cold trap of claim 1 wherein the end closures disposed at said entrance and exit ends are each provided with an adjusting screw designed to engage said baffle assembly and to adjust the position of the baffle assembly in a longitudinal direction.

8. The cold trap of claim 1 wherein said baffle assembly includes a threaded rod and a plurality of cooperating nuts which secure said spaced baffle plates to the threaded rod.

* * * * *